(12) United States Patent
Lemcke et al.

(10) Patent No.: US 6,698,289 B1
(45) Date of Patent: Mar. 2, 2004

(54) DEVICE FOR MEASURING DISTANCE

(75) Inventors: Sören Lemcke, Gaienhofen-Horn (DE); Peter Hora, Schrobenhausen (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/868,714
(22) PCT Filed: Nov. 12, 1999
(86) PCT No.: PCT/DE99/03609
§ 371 (c)(1), (2), (4) Date: Oct. 16, 2001
(87) PCT Pub. No.: WO00/37886
PCT Pub. Date: Jun. 29, 2000

(30) Foreign Application Priority Data

Dec. 21, 1998 (DE) .......................... 198 59 202

(51) Int. Cl.[7] .............................. G01N 29/04
(52) U.S. Cl. .............. 73/597; 73/598; 73/602
(58) Field of Search .................. 73/597, 598, 600, 73/602, 290 V, 1.73, 1.79, 290 R, 627, 628; 367/122, 127, 129

(56) References Cited

U.S. PATENT DOCUMENTS

| | | | | |
|---|---|---|---|---|
| 3,741,003 A | * | 6/1973 | Gunkel .................... | 73/637 |
| 4,385,522 A | | 5/1983 | Mittleman ................ | 73/632 |
| 4,918,672 A | * | 4/1990 | Iwabuchi et al. .......... | 367/99 |
| 5,163,323 A | * | 11/1992 | Davidson ................. | 73/290 V |
| 5,241,287 A | | 8/1993 | Jen ...................... | 333/143 |
| 5,418,758 A | * | 5/1995 | Webster .................. | 367/101 |
| 5,629,681 A | | 5/1997 | DuVall et al. ............ | 340/665 |
| 5,699,280 A | * | 12/1997 | Oda et al. ............... | 702/158 |
| 5,768,939 A | * | 6/1998 | Quayle et al. ............ | 73/290 V |
| 5,827,943 A | * | 10/1998 | Schmidt .................. | 73/1.73 |
| 5,828,584 A | * | 10/1998 | Oda et al. ............... | 702/158 |
| 5,936,161 A | * | 8/1999 | Fischer .................. | 73/632 |

FOREIGN PATENT DOCUMENTS

| | | |
|---|---|---|
| DE | 30 06 107 A1 | 9/1980 |
| DE | 38 20 883 A1 | 12/1989 |
| GB | 2 043 250 A | 10/1980 |

* cited by examiner

Primary Examiner—Hezron Williams
Assistant Examiner—Jacques Saint-Surin
(74) Attorney, Agent, or Firm—Fay, Sharpe, Fagan, Minnich & McKee, LLP

(57) ABSTRACT

The invention relates to a device for distance measurement, comprising a transmission element (9) for emitting pulsed acoustic or electromagnetic waves. Said transmission element is provided at a first end of a distance (L) or at a known distance from said first end. The device contains a receiving element (13) for the emitted waves. Said receiving element (13) receives said waves at a second end of the distance (L) or, after reflection at the second end, at the first end. An evaluation and control unit (11) calculates the distance (L) from the running time and the signal speed. According to the invention, a telescope tube (3) with two engaging tube elements (5, 7) is used between the first and second end. The transmission element (9) and the receiving element (13) are arranged on the tube elements (5, 7) respectively or are coupled thereto via waveguides. One of the tube elements can also be coupled to a displaceable element which can change location.

29 Claims, 2 Drawing Sheets

DEVICE FOR MEASURING DISTANCE

BACKGROUND OF THE INVENTION

The present invention relates to the distance measurement arts. It particularly relates to distance measurement using an ultrasound transmitter and receiver, and will be described with particular reference thereto. However, it is to be appreciated that the invention can be used with any other pulsed waves including electromagnetic waves.

Automotive technology frequently calls for measuring the distance between two objects in a simple and cost-effective manner. Exemplary automotive technology applications include measurement of the distance of a wheel suspension, e.g. the mobile part of a shock absorber, relative to the vehicle body. Such a measurement is used in adaptive running gear adjustment.

Another exemplary application is in the area of airbag control. Typically, the activation of the airbag triggering mechanism and/or the activation of various airbag triggering stages depends upon the position of the affected passenger. In such applications, the position of the seat is typically recorded to provide a rough measure of the distance between the person and the airbag.

Various distance measuring devices are known for these types of applications. In many cases including the aforementioned exemplary applications, there is a need to measure the absolute distance. In these cases, more costly absolute value measurement devices are employed rather than incremental measurement devices. These applications are also usually incompatible with the known method of using an incremental device and determining the absolute distance therefrom by initializing to a known position and then measuring the movement from that position to determine the absolute distance. When recording, for example, the position of a vehicle seat, it would be necessary to move the seat into a known initial position in order to implement absolute distance measurement using an incremental device in the above-described manner. For safety reasons, such initializing would preferably be repeated whenever the triggering mechanism is disconnected from electrical power. Without such re-initializing, inaccurate absolute value measurements are possible, which would result in defective airbag control.

Conventional absolute distance measurement devices for measuring the position of a movable object operate on an inductive or a capacitive basis. During movement of the object to be measured, the inductance or capacitance of a corresponding sensor changes.

In another known absolute distance measurement device type, the position of a person in a motor vehicle seat is measured by means of ultrasound waves. In a typical case, such measurement involves measurement of the distance from the head or upper torso of the person to the airbag.

Another application of ultrasound absolute distance measuring devices is in parking aid devices.

When recording the position of an object by means of ultrasound, the usual method is to measure the transit time of an impulse train from transmission to detection. The detection can be either of the direct ultrasound signal or of its reflection off the target object.

The currently known devices for measuring distances are, however, primarily employable only in specific applications, specifically the movement of an object in a motor vehicle. This applies, in particular, in the case of large regulating distances of the object.

Devices for measuring distance which function on an ultra-sound basis also have the drawback that other objects can interfere with the signal path and thereby lead to faulty control of the corresponding actuators.

Starting from said state of the art, it is an object of the invention to create a device having a simple and cost-effective design, which can be integrated in simple fashion into a vehicle and which permits registration of the position or distance of a preferably movable object from a given point of reference with sufficient safety and accuracy.

SUMMARY OF THE INVENTION

The invention includes a telescopic tube having at least two engaging tube elements. A transmitter element is provided on one tube element and at least one receiver element is provided on the other tube element. By using the telescope tube, objects are prevented from unintentionally interfering in the operational space between the transmitter and the receiver. In addition, the construction of the device enables complete pre-assembly of the device before installation on a vehicle. The installation on the vehicle is then quick and easy. The inner tube element of the telescope tube may be replaced as desired by an element which is displaceable in the outer tube element.

According to a preferred embodiment of the invention, the at least one of a transmitter element and a receiver element are provided at a front side or at partition walls of the tube elements and extend vertically relative to the axis of the telescope tube. As a result, the transmitter element and the receiver element can essentially be positioned along the axis of the tube, so that the signal essentially also propagates along the axis of the tube. Consequently, no complicated signal evaluation is required to compensate for the reflections of the signal along the tube wall.

The signal of the transmitter element can also be passed to the telescope tube via rigid or flexible waveguides, e.g. via flexible plastic hose. In this case, it will be appreciated that the length of the waveguide between the transmitter element and the telescope tube or the end of the distance to be measured is preferably taken into consideration in determining the distance from the signal transit time and the signal velocity.

In like fashion, it is possible to transmit the receiver signal also to the transmitter element via a corresponding waveguide, whereby said length must also be taken into consideration in determining the distance. This applies not only with respect to the length of the waveguide, but also to a partial length of the telescope tube, if the transmitter or receiver elements are not arranged at the end points of the distance to be measured. In this instance, the corresponding portion of the telescope tube functions as part of the aforementioned waveguide.

Furthermore, in the preferred embodiment of the invention, a second receiver element is provided on the tube upon which the transmitter element is arranged. The second receiver is spaced apart from the transmitter by a known distance. Said second receiver element serves for determining the signal velocity by measuring the signal transit time between the transmitter element and the second receiver element, making use of the known distance between these two elements. The determined signal velocity is then used for determining a highly accurate absolute value for the distance between the transmitter element and the first receiver element.

The second receiver element is also selectively disposed at a coupling waveguide in operative communication with the telescope tube. Alternatively, the second receiver element can be connected by means of an additional decoupling waveguide in operative communication with the coupling waveguide or with the telescope.

It is possible to compensate in this fashion for variations in the signal frequency or for temperature variations that affect the signal velocity through temperature variations in the density of the medium.

It is to be appreciated that the second receiver element is selectively provided at the tube element at which the first receiver element is arranged. Alternatively, the second receiver element is arranged at or in a decoupling waveguide between the telescope tube and the receiver element. With this arrangement, the signal velocity is determined using knowledge of the distance between the two receiver elements and the recorded signal transit time between the two receiver elements.

The invention is preferably employed to measure distance using electromagnetic waves, including waves within the optical spectrum, or using acoustic waves. Measurement by the invention using acoustic waves is preferred because the acoustic transmitter and receiver elements are cost-effective. The required evaluation electronics can also be of simple and cost-effective construction due to the relatively low signal velocity (i.e., the diffusion velocity of the signal) between the transmitter and the receiver.

According to another embodiment, the peripheral walls of the telescope tube are provided with perforations for attenuating signal portions that reflect off the wall. These perforations reduce the reflectivity of the walls. Optionally, appropriate damping materials are provided at the interior walls of the tube elements. Optionally, the interior walls are fitted with appropriate geometric attenuation elements.

The receiver element is preferably provided at the end of the telescope tube opposite the transmitter element, i.e. in an appropriate end region of the telescope tube. The receiver element is alternatively be at the same end of the telescope tube as the transmitter element. In the former case, the transmitter signal is registered directly by the receiver element. In the latter case the transmitter signal is registered at a reflecting wall provided at the appropriate end inside at least the one additional tube element.

In yet another embodiment, the transmitter element and the receiver element are formed as an integrated transmitter/receiver element. In the case of an ultra-sound converter, the converter serves as both the transmitter and the receiving element. With this type of integrated design, however, it is to be appreciated that the reactance time of the converter must be lower than the lowest signal transit time to be measured. The reactance time is the time that the converter maintains oscillations after being switched off. During the reactance time period, the converter cannot function with adequate precision as a receiving element.

According to yet another embodiment of the invention, an evaluation-and-control unit, which acts upon the transmitter element and to which signals are passed for evaluation from the receiver elements, is integrated with the telescoping tube.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

DETAILED DESCRIPTION OF THE PREFERRED EMBODIMENTS

Figure 1:
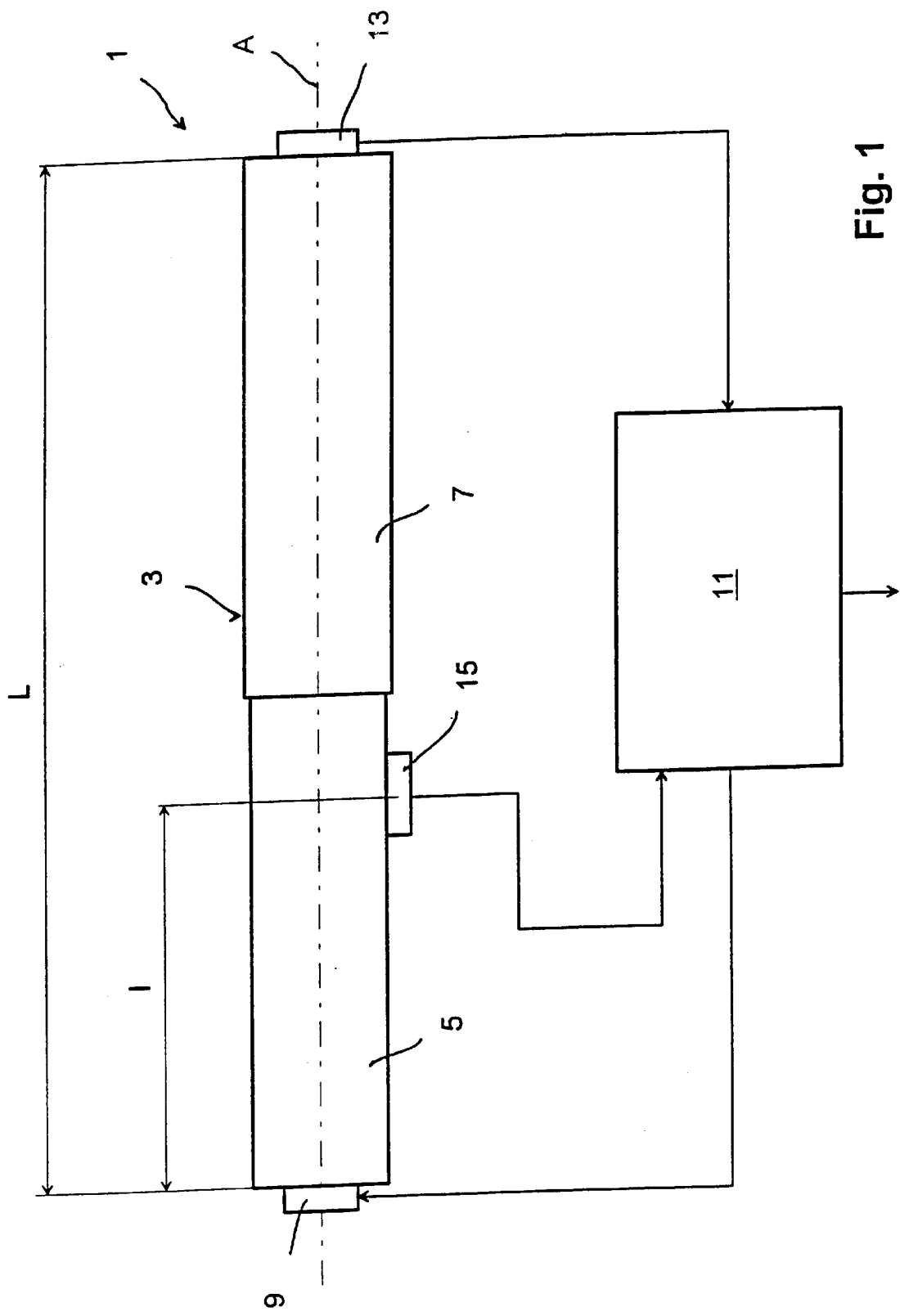
FIG. 1 shows a schematic depiction of a first embodiment of the invention.

The first preferred embodiment shown in FIG. 1 of a device 1 for distance measuring includes a telescope tube 3 having two tube elements 5, 7 arranged in a coinciding manner as relatively displaceable tube elements.

A transmitter element 9, which is preferably an ultrasound transmitter is provided at the free end of the interior tube 5. The transmitter element 9 is preferably arranged at a front side or inside of the tube 5, so that the reflection of acoustical waves takes place along the major longitudinal axis A of the telescope tube 3. Under this arrangement, the acoustical field predominantly expands in the direction of the axis A so that those portions of the acoustical filed that reflect from the interior sides of the tube walls will not lead to false measurements or necessitate costly signal evaluation. An evaluation-and-control unit 11 is provided for selective operation of the transmitter 9. In addition, the initial signal of a receiver element 13 is passed to the evaluation-and-control unit 11. The receiver element 13 is, in turn, disposed at the end or within an end region of the outer tube element 7 in such a manner that the axis of the receiving portion of the receiver element 13 is in alignment with the axis A of the telescope tube 3.

The evaluation-and-control unit 11 determines the length of the path or the distance L between the transmitter element 9 and the receiver element 13 by measuring the transit time of a pulse-like signal. The transit time $\Delta t$ is preferably ascertained by measuring the time between the electrical selective operation of the transmitter element 9 and the receipt of the signal by the receiver element 13. It is to be appreciated that various methods known in the art for signal evaluation can be used for this purpose. For example, the operating of the transmitter and/or the receiver signal selectively includes analytical functions, in which case the transit time $\Delta t$ is determined by ascertaining the time between corresponding extreme values of the analytical functions. Of course, data can also be obtained for several measuring steps.

When only a single receiver element 13 is used, it is typically necessary to store the value of the signal velocity $(v_s)$ in the evaluation-and-control unit 11, so that the distance L is calculated according to:

$$L = v_s \cdot \Delta t \qquad (1).$$

In cases in which an initialization process can be employed, the tube elements 5, 7 of the telescope tube 3 can be inserted into each other in a pre-determined position which has a known length or distance $L_1$. By measuring the transit time $\Delta t_1$ for this configuration, the signal velocity $v_s$ is ascertained as:

$$v_s = \frac{L_1}{\Delta t_1} \qquad (2).$$

Following the aforementioned step of initializing or calibrating the device for measuring distance, it is then possible to register any distance L using the velocity $v_s$ calculated in equation (2) in the equation (1).

Using this type of calibration of the device 1 for measuring distance according to the invention, it is also possible to compensate for variations in the characteristics of the transmitter element 9 or for temperature influences which affect the signal velocity. For example, it is known that the signal velocity $v_s$ changes by approximately 30% over a relevant temperature range for motor vehicle technology of −40° C. to +150° C. The temperature dependence of the velocity results from changes in the density of the medium (preferably air) transmitting the acoustical waves as well as from changes in the reflection characteristics and the operating frequency of the transmitter element 9.

When an initialization step cannot be performed in the previously described manner, the interfering influences on the signal velocity $v_s$ are optionally compensated for by providing an additional transmitter element 15 at the telescope tube 3. For example, in FIG. 1 the additional transmitter 15 is arranged at a predetermined distance 1 from the transmitter element 9 at the inner tube element 5. This enables determination of the signal velocity $v_s$ from the predetermined distance 1 and the relevant transit time $\Delta t_1$ registered during a reference measuring step. The additional receiver 15 can, for example be arranged as shown in FIG. 1 at the circumference of the particular tube element. It will be appreciated, however, that other arrangements for the attachment of the additional receiver element 15 are also contemplated for ensuring reliable signal registration and hence reliable measurement of the transit time $\Delta t_1$.

The additional receiver element 15 is alternatively provided at the tube element 7 wherein the receiver element 13 is arranged (not shown). In this arrangement, the transit time is determined not from the difference between the selective operation of the transmitter element 9 and the signal receipt by the receiver element 13, but rather from the transit time between the received signal of the additional receiver element 15 and the received signal of the receiver element 13, whereby, of course, the same impulse or impulse train is recorded by both receivers 15, 13.

In yet another embodiment, the receiver element 13 is disposed in the same transverse plane of the telescope tube 3 as the transmitter element 9 (arrangement not shown). In this arrangement, a reflective wall is provided at the last tube element (e.g., tube element 7 of FIG. 1). Determination of the length or distance L is made according to the equation:

$$L = v_s \cdot \tfrac{1}{2}\Delta t \tag{3}$$

where the factor of ½ arises because the transmitter signal now travels the signal path twice.

When ultra-sound converters are employed as the transmitter element 9 and the receiver element 13, it is also possible to realize the transmitter element and the receiver element as a single unitary ultra-sound converter, since such devices can be operated in both transmission and receive modes. In that case, however, care should be taken that the minimum recordable length L, or equivalently the minimum signal transit time $\Delta t$ is greater than the reactant time of the ultra-sound converter. The reactant time is that time that elapses between the termination of a transmitter signal that selectively operates the ultra-sound converter and the decay of the oscillation. Only following the elapse of the reactant time is the converter fully available as a receiving element.

In one exemplary application of the inventive device for measuring distance, the inner tube 5 is connected in stationary fashion with the body of a motor vehicle, and the outer tube element 7 is displaceably attached to a movable motor vehicle seat. As the seat is moved, the length L of the telescope is changed accordingly. The change or the absolute value of the length of the tube is recorded via the invention-specific device for measuring distance.

Figure 2:
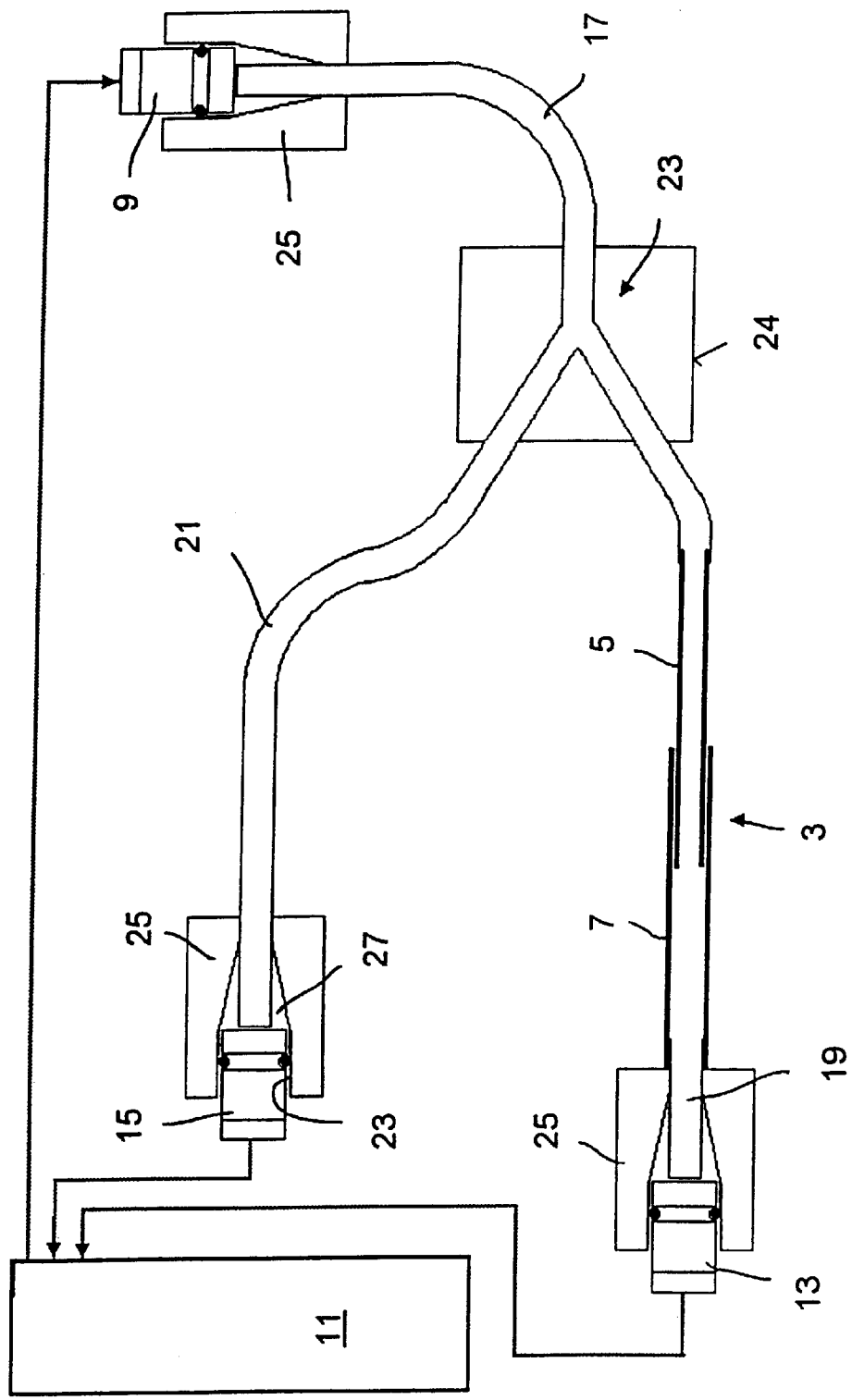
FIG. 2 shows a schematic depiction of a second embodiment of the invention having a coupling of the transmitter element via a waveguide and a separate reference measuring device.

With reference now to FIG. 2, a second preferred embodiment of the invention is illustrated, in which coupling of the transmitter element 9 is effected by means of a coupling waveguide 17. This enables flexible positioning of the transmitter element 9 in case of space restrictions. When determining the distance L which is to be recorded, it will be recognized that appropriate consideration should be taken of the length of the coupling waveguide 17. This can be done by simply subtracting the length of the coupling waveguide from the total length as a function of the signal transit time, the signal velocity, and the position of the telescope tube.

Coupling of the receiver element 13 with the outer tube element 7 of the telescope 3 is likewise done in the exemplary embodiment represented in FIG. 2, by means of a decoupling waveguide 19. The length of the decoupling waveguide 19 must also, of course, be taken into account when determining the distance which is to be recorded.

Moreover, the embodiment of FIG. 2 differs from the embodiment according to FIG. 1 in that the additional transmitter element 15 for compensation (primarily of temperature changes) is not arranged on the telescope tube 5, but rather on a separate difference-decoupling waveguide 21. The reference decoupling waveguide 21 branches off from the coupling waveguide 17 at a coupling location 23. The coupling location 23 can be realized, for example, by means of a coupling element 24, in which a "Y"-shaped channel is provided. The waveguides are then connected at appropriate ports of the coupling element 24. The overall length of the coupling waveguide up to the coupling location 23 is constant so that the signal velocity is determined from said prior known length and the signal transit time detected by means of the additional receiver element 15.

It will be appreciated that, in the case of the embodiment of FIG. 2, the signal velocity in the reference de-coupling waveguide preferably does not differ, or at most differs to a negligibly small extent, from the signal velocity in the coupling waveguide 17 or in the telescope tube 3.

Preferably, rigid plastic tubes or flexible plastic hoses are employed, for example, as coupling waveguides.

With continuing reference to FIG. 2, a particular embodiment of the coupling of the transmitter and receiver elements is presented. The transmitter element 9 or the receiver elements 13, 15 are preferably accepted in appropriate recesses 23 of coupling devices 25. The respective coupling waveguide 17, 19, and 21 are positioned with their front side faces adjacent to the membrane of the transmitter element 9 or the receiver elements 13 and 15, respectively. Preferably, only a small air gap separates the front side faces of the waveguides and the membranes of the transmitter and receiver elements. This results in the benefit that essentially only signals that travel along the axis of the waveguides are coupled. The axes of the transmitter element 9 and/or the receiver elements 13, 15 are preferably oriented in alignment with the axes of the coupling waveguides 17, 19, 21 as illustrated.

An annular compartment 27 is formed within the coupling device 25 adjacent the end regions of the coupling waveguides 17, 19, 21. The annular compartment 27 enlarges conically from the outer circumference of the coupling waveguide in the direction toward the transmitter element and/or receiver element. This conical shaping ensures that large-angle signal portions that exit from the gap between the front side of the waveguide and the transmitter or receiver element into the annular compartment 27 decay and/or are absorbed in the compartment. By this mechanism, negative influence on the transmitter element 9 by reflected portions is prevented.

In order to obtain the best possible attenuation with respect to signal portions which are not coupled into the waveguide, the annular compartment 27 is selectively filled with a damping material (not shown), or with structures at the inner wall of the annular compartment for absorption of the particular wave portions (not shown).

The annular compartment 27 of the coupling device 25 serves, in the case of the transmitter element 9, to destroy signal portions which are not coupled in the waveguide 17. In order to avoid interfering reflections in the direction toward the membrane of the transmitter element 9, the respective annular compartment serves, in the case of receiver elements 13, 15, to destroy signal portions exiting from the air gap between the front of the coupling waveguide and the membrane of the receiver element. The respective annular compartment also prevents interfering reflections in the direction toward the membrane.

It will be appreciated that individual characteristics of the embodiments of FIGS. 1 and 2 can, in each case, also be combined as desired to form additional embodiments.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A device for measuring distance comprising:
   an ultra-sound transmitter element adapted to emit acoustical waves, the transmitter element being disposed at a first end of a distance (L) to be measured and having a face surface defining a first diameter;
   an ultra-sound receiver element adapted to receive the emitted acoustical waves, which is provided at the other end of the distance (L) to be measured;
   an evaluation and control unit operative to control the transmitter and communicate with the receiver, whereby the distance (L) to be measured is determined from a transit time of the acoustical waves and a velocity of the acoustical waves; and,
   a telescope tube having a first part displaceably arranged inside a second part, said telescope tube being operatively connected on a first end with the transmitter element and on a second end with the receiver element whereby said acoustical waves emitted by the transmitter at said first end of said distance L pass through at least a portion of the telescope tube and are received by the receiver said first end of the telescope tube having a second diameter smaller than said first diameter of the transmitter element.

2. Device according to claim 1, wherein the telescope tube defines an annular compartment adapted to receive said transmitter element, the annular compartment being filled with damping material.

3. Device according to claim 1 wherein said telescope tube is a wave-guide, and further including an additional ultra-sound receiver element connected with the waveguide, the evaluation- and control unit being adapted to determine from the known distance between the ultra-sound transmitter element and the additional ultra-sound receiver element, the signal velocity and/or changes in the signal velocity and utilize same for the determination of the distance (L) from the signal transit time recorded by means of the ultra-sound transmitter element and the ultra-sound receiver element.

4. Device according to claim 1 further including a second ultra-sound receiver element wherein the evaluation and control unit is adapted to determine from the known distance between the ultra-sound receiver element and the additional ultra-sound receiver element the signal velocity and/or changes in the signal velocity and utilizes for determination of the distance (L) the signal transit time recorded by means of the ultra-sound transmitter element and the ultra-sound receiver element.

5. Device according to claim 1 wherein the ultra-sound transmitter element and the ultra-sound receiver element are arranged in the axis (A) of the telescope tube for joining the ultra-sound transmitter element and/or the ultra-sound receiver element with the telescope tube, are essentially connected with same in the axis (A) of the telescope tube.

6. Device according to claim 1 wherein peripheral walls of the telescope tube have perforations for damping of reflections.

7. Device according to claim 1 wherein the ultra-sound transmitter element and the ultra-sound receiver element are an integrated ultra-sound transmitter/receiver element.

8. Device according to claim 1 wherein the evaluation and control unit is designed as an integrated component of the telescope tube.

9. Device according claim 1 wherein the evaluation and control unit is disposed inside the telescope tube.

10. A device for measuring a distance comprising:
    a transmitter element;
    a telescopic tube having a first tube element operatively connected with the transmitter element, and having a second tube element slidably coupled with the first tube element;
    a receiver element arranged to receive a signal transmitted by the transmitter element after said signal traverses a path that passes through at least a portion of the first tube element and that passes through at least a portion of the second tube element, a length of said signal path being adjustable based on a relative position between the first and the second tube elements; and
    an evaluation-and-control unit in operative communication with the transmitter element and the receiver element, said evaluation-and-control unit being adapted to perform the steps of:
        selectively operate the transmitter element to transmit said signal,
        communicate with the receiver element to detect the reception of said signal by the receiver element,
        evaluate the signal received by the receiver element to obtain a transit time between the signal transmission and the signal reception, and
        extract the distance to be measured based on the transit time, a pre-determined signal velocity, and a pre-determined equation that relates said distance with the transit time and the signal velocity.

11. The device as set forth in claim 10, wherein:
    the transmitter element includes an ultra-sonic transmitter adapted to generate an ultra-sonic signal; and
    the receiver element includes an ultra-sonic receiver.

12. The device as set forth in claim 11 wherein the ultra-sonic transmitter element and the ultra-sonic receiver element are formed as a single unitary ultra-sound converter.

13. The device as set forth in claim 11, wherein a connection of the transmitter element with the first tube element includes:
    a conically expanding annular compartment disposed at an end of the first tube element in alignment with a membrane of the ultra-sonic transmitter to couple the ultra-sonic signal with the first tube element.

14. The device as set forth in claim 13, further comprising a damping material disposed in the annular compartment.

15. The device as set forth in claim 10, wherein a connection of the transmitter element with the first tube element includes a waveguide disposed therebetween.

16. The device as set forth in claim 10, further comprising:
a second receiver element in operative communication with the evaluation-and-control unit and with the telescopic tube.

17. The device as set forth in claim 16, wherein:
the second receiver element is disposed at an operative distance from the transmitter element; and
the evaluation-and-control unit is further adapted to perform the steps of:
selectively operate the transmitter element to transmit a calibrating signal,
communicate with the second receiver element to detect the reception of said calibrating signal by the second receiver element,
evaluate the calibrating signal received by the second receiver element to obtain a calibrating signal transit time, and
obtain the pre-determined signal velocity based on the calibrating signal transit time and a calibration equation that relates the signal velocity with the calibrating signal transit time.

18. The device as set forth in claim 17, wherein the calibration equation is:

$$v_s = \frac{L_1}{\Delta t_1}$$

where $L_1$ is the operative distance between the transmitter and the second receiver, $\Delta t_1$ is the calibrating signal transit time, and $v_s$ is the obtained pre-determined signal velocity.

19. The device as set forth in claim 16, wherein:
the second receiver element is disposed at an operative distance from the receiver element; and
the evaluation-and-control unit is further adapted to perform the steps of:
selectively operate the transmitter element to transmit a calibrating signal,
communicate with the receiver element to detect the reception of said calibrating signal by the receiver element,
communicate with the second receiver element to detect the reception of said calibrating signal by the second receiver element,
evaluate the calibrating signal received by the receiver element and the second receiver element to obtain a calibrating signal transit time, and
obtain the pre-determined signal velocity based on the calibrating signal transit time and a calibration equation that relates the signal velocity with the calibrating signal transit time.

20. The device as set forth in claim 10, wherein a connection between the second receiver element and the telescope tube includes a waveguide disposed therebetween.

21. The device as set forth in claim 10, wherein:
the transmitter element and the receiver element are arranged at opposite ends of the telescope tube; and
the pre-determined equation that relates said distance with the transit time and the signal velocity is:

$$d = v_s \cdot \Delta t$$

where d is the distance to be measured, $v_s$ is the pre-determined signal velocity, and $\Delta t$ is the transit time.

22. The device as set forth in claim 10, wherein:
the transmitter element and the receiver element are arranged at the same end of the telescope tube;
the second tube element includes a reflective surface arranged to reflect the transmitted signal toward the receiver element; and
the pre-determined equation that relates said distance with the transit time and the signal velocity is:

$$d = v_s \cdot \tfrac{1}{2} \Delta t$$

where d is the distance to be measured, $v_s$ is the pre-determined signal velocity, and $\Delta t$ is the transit time.

23. The device as set forth in claim 10 wherein the transmitter element and the receiver element are arranged along a central longitudinal axis defined by the telescopic tube.

24. The device as set forth in claim 10 further comprising perforations formed on at least a portion of the peripheral walls of the telescope tube, said perforations damping signal reflections off of said peripheral walls.

25. The device as set forth in claim 10 wherein the evaluation-and-control unit is integrated into the telescopic tube.

26. The device as set forth in claim 10 wherein the evaluation-and-control unit is disposed inside the telescopic tube.

27. A device for measuring a distance comprising:
a telescope tube having displaceably interconnected first and second tube elements;
an ultra-sonic transmitter operatively connected with the first tube element;
an ultra-sonic receiver element operatively connected with one of the first and the second tube elements; and
an evaluation-and-control unit in operative communication with the transmitter element and the receiver element, said evaluation-and-control unit selectively operating the transmitter element to transmit an ultrasonic signal into the telescope tube; detecting reception at the receiver element of the ultrasonic signal after said signal passes through at least a portion of the second tube element; deriving a signal path length from the signal transit time and a signal velocity; and, calculating the distance to be measured based on the signal path length and the geometrical relationship between the transmitter, receiver, and telescope tube.

28. The device for measuring a distance as set forth in claim 27, further comprising:
a second ultra-sonic receiver arranged in operative communication with the telescope tube.

29. The device for measuring a distance as set forth in claim 28, wherein the evaluation-and-control unit is adapted to:
detect reception at the second receiver element of the ultrasonic signal after said signal passes through at least a portion of the second tube element,
obtain a calibration time corresponding to a time interval between detecting reception at the second receiver and one of detecting reception at the receiver and selectively operating the transmitter element, and
calculate the signal velocity based on the calibration time and a pre-determined calibration signal path length.

* * * * *